US010429247B2

(12) United States Patent
Maeno et al.

(10) Patent No.: US 10,429,247 B2
(45) Date of Patent: Oct. 1, 2019

(54) REACTOR

(71) Applicant: TAMURA CORPORATION, Tokyo (JP)

(72) Inventors: Kensuke Maeno, Sakado (JP); Masashi Yamada, Sakado (JP)

(73) Assignee: TAMURA CORPORATION, Tokyo (JP)

(*) Notice: Subject to any disclaimer, the term of this patent is extended or adjusted under 35 U.S.C. 154(b) by 314 days.

(21) Appl. No.: 15/387,778

(22) Filed: Dec. 22, 2016

(65) Prior Publication Data

US 2017/0184457 A1    Jun. 29, 2017

(30) Foreign Application Priority Data

Dec. 28, 2015 (JP) ................................. 2015-256178

(51) Int. Cl.
| H01F 27/02 | (2006.01) |
| G01K 1/14 | (2006.01) |
| G01K 7/22 | (2006.01) |
| H01F 27/40 | (2006.01) |
| H01F 37/00 | (2006.01) |

(52) U.S. Cl.
CPC ............... *G01K 1/14* (2013.01); *G01K 7/22* (2013.01); *H01F 27/02* (2013.01); *H01F 27/402* (2013.01); *H01F 37/00* (2013.01); *G01K 2205/00* (2013.01); *H01F 2027/406* (2013.01)

(58) Field of Classification Search
CPC .............................. H01F 5/00; H01F 27/00–36
USPC ........ 336/55–62, 65, 196, 198, 212, 233–234
See application file for complete search history.

(56) References Cited

U.S. PATENT DOCUMENTS

| 6,812,818 B2 * | 11/2004 | Lee ....................... H01F 27/402 336/55 |
| 8,035,470 B2 * | 10/2011 | Viitanen .................. H01F 3/12 336/110 |
| 10,141,102 B2 * | 11/2018 | Inaba ..................... H01F 37/00 |

FOREIGN PATENT DOCUMENTS

| JP | 2012-94924 A | 5/2012 |
| JP | 2012216741 A | * 11/2012 |
| JP | 2014-053335 A | 3/2014 |
| JP | 2015-103628 | 6/2015 |

OTHER PUBLICATIONS

Office Action issued on Jun. 25, 2019, for corresponding Japanese patent application 2015-256178 with its English machine translation.

* cited by examiner

*Primary Examiner* — Tuyen T Nguyen
(74) *Attorney, Agent, or Firm* — Nath, Goldberg & Meyer; Jerald L. Meyer; Stenley N. Protigal

(57) ABSTRACT

A reactor is provided which can be reduced in size, can prevent falling off of the temperature sensor and can make accurate temperature detection.
The reactor comprises: an annular core 10; a resin member 20 covering a periphery of the annual core 10; a coil 5 attached to an outer circumference of the resin member 20; and a temperature sensor 9 inserted into a gap between the resin member 20 and the coil 5. The temperature sensor 9 has a columnar temperature detection portion 9a, and at least a part of the temperature detection portion 9a is sandwiched by the resin member 20 and the coil 5 in close contact.

16 Claims, 12 Drawing Sheets

REACTOR

CROSS-REFERENCE TO RELATED APPLICATION

This application is based upon and claims the benefit of priority from Japan Patent Application No. 2015-256178, filed on Dec. 28, 2015, the entire contents of which are incorporated herein by reference.

TECHNICAL FIELD

The present disclosure relates to a reactor comprising a temperature sensor.

BACKGROUND ART

A reactor is used in various applications including a driving system of a hybrid vehicle and an electric vehicle and the like. For example, as a reactor used for an onboard booster circuit, the one in which a pair of coils are wound around a bobbin made of resin disposed around a core is used in many cases.

In this type of reactors, if a high current is continuously flown to the coil, the coil is overheated and electric characteristics of the reactor decreases.

Therefore, an internal temperature is detected by a temperature sensor such as a thermistor, and conduction control is carried out so that the coil is not heated to a certain temperature or higher.

SUMMARY OF THE INVENTION

Problems to be Solved

Conventionally, detection of the internal temperature of the reactor is performed by arranging a temperature sensor between the pair of coils. However, a space for arranging the temperature sensor between the coils and a space for a member for holding this temperature sensor should be ensured, causing a reactor size to increase.

Moreover, in this case, since the temperature sensor is covered by the holding member on its periphery, it does not contact directly with the coil which is one of heat sources. Therefore, a detected temperature is different from an actual coil temperature, and accurate temperature detection cannot be made in some cases.

The present disclosure was made in order to solve the problem described above and the object is to provide a reactor which can be reduced the size, can prevent the temperature sensor from falling off and can make accurate temperature detection.

Solution to Problem

A reactor of the present disclosure has the following structures:
(1) The reactor comprises a core, a resin member covering a periphery of the core, a coil attached to an outer circumference of the resin member, and a temperature sensor inserted into a gap between the resin member and the coil;
(2) The temperature sensor has a columnar temperature detection portion; and
(3) At least a part of the temperature detection portion is sandwiched by the resin member and the coil in close contact.

In the present disclosure, the following structures may be provided:
(1) The resin member is provided with a recess portion in which the temperature detection portion is arranged;
(2) The recess portion has a shape wider on a side the temperature detection portion is to be inserted and dented on a depth side;
(3) The recess portion has an insertion port which the temperature sensor is to be inserted, and an inner circumferential surface of the recess portion is provided with an insertion guide for the temperature sensor continuously from the insertion port guiding a tip of the temperature detection portion to a position a position the tip of the temperature detection portion is to be arranged to;
(4) The inner circumferential surface of the recess portion is provided with a tip position regulating portion having a shape following the tip of the temperature detection portion;
(5) The insertion guide extends from the insertion port to the tip position regulating portion;
(6) The insertion port and a part of the insertion guide are exposed to an outside of the coil attached to the outer circumference of the resin member; and
(7) A bottom surface of the recess portion is provided with inclination which gradually reduces the gap from the insertion port side toward the tip position regulating portion side.

Moreover, in the present disclosure, the following structures may be provided:
(8) The temperature sensor has a lead wire connected to a rear end of the temperature detection portion; the resin member is provided with a protruding portion opposing to the rear end of the temperature detection portion and protruding higher than the bottom surface of the recess portion; and the lead wire abuts on the protruding portion; and
(9) On a surface of the resin member, a locking portion is arranged as the protruding portion coaxial with the temperature detection portion and on the rear end side of the temperature detection portion; the locking portion is provided with a notch which the lead wire is passed through; and the lead wire abuts on an inner circumferential surface of the locking portion forming the notch.

Advantageous Effects of Invention

According to the present disclosure, a reactor capable of size reduction and accurate temperature detection can be obtained.

DESCRIPTION OF EMBODIMENTS

Hereinafter, a reactor of an embodiment of the present disclosure will be described below by referring to the attached drawings.

1. First Embodiment

[1-1. Outline Structure]

Figure 1:
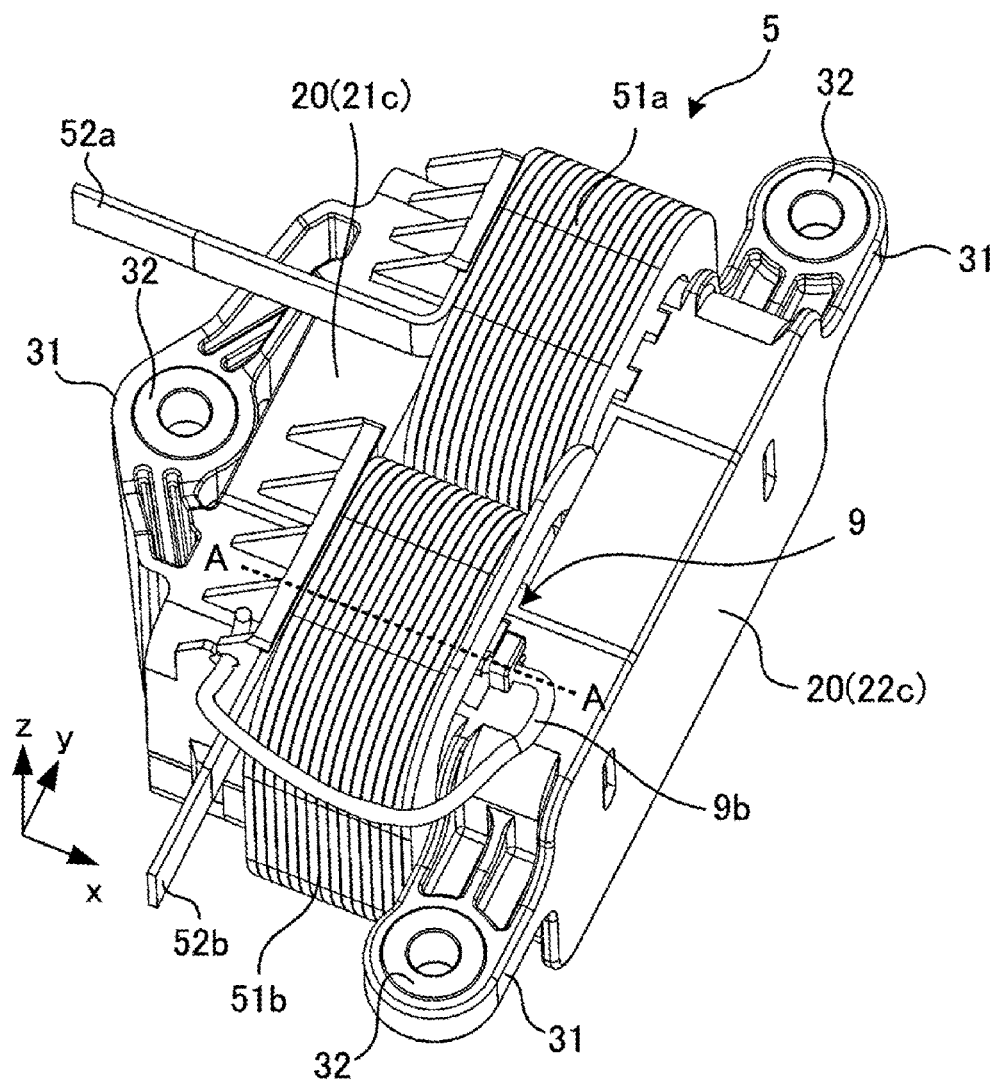
FIG. 1 is a perspective view illustrating entire structure of a reactor according to a first embodiment.
Figure 2:
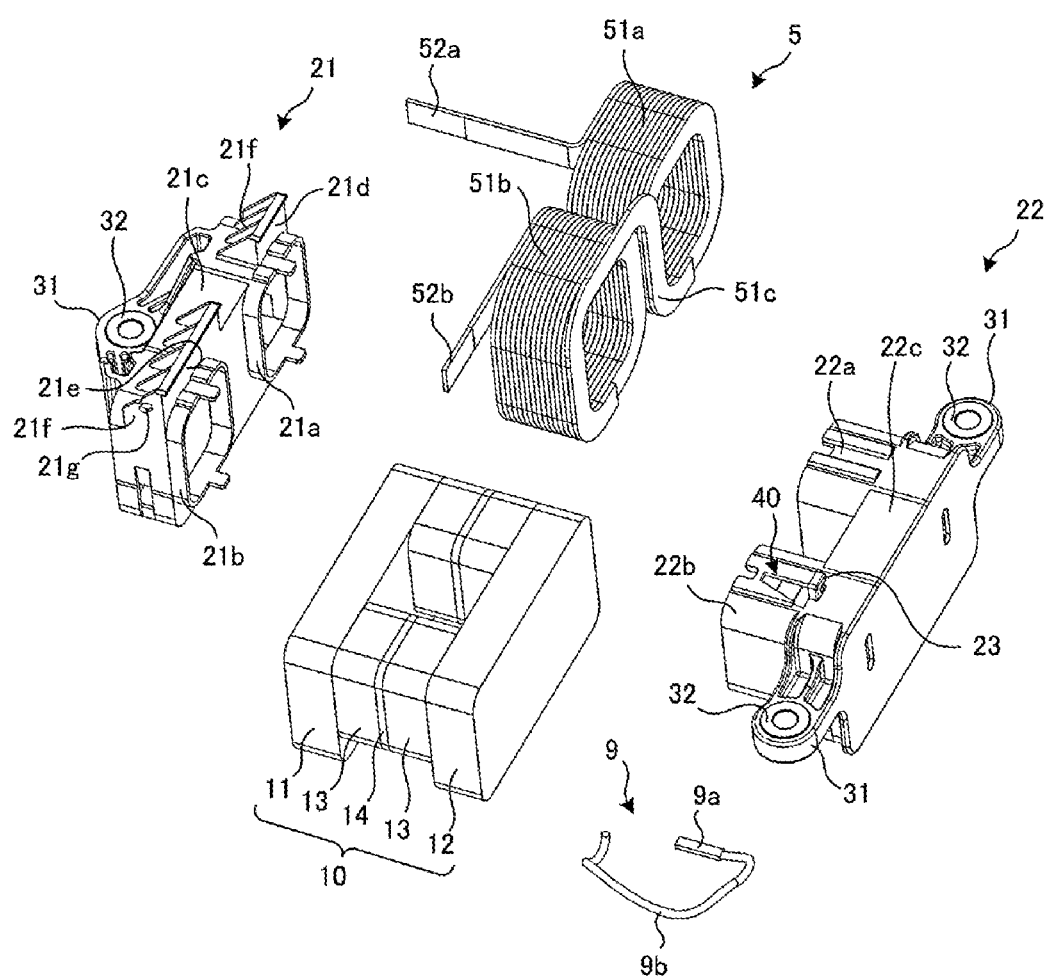
FIG. 2 is an exploded perspective view illustrating entire structure of the reactor according to the first embodiment.

FIG. 1 is a perspective view illustrating entire structure of a reactor according to this embodiment, and FIG. 2 is the exploded perspective view.

The reactor is an electromagnetic component which converts electric energy to magnetic energy and accumulates and emits it, and is used for raising/lowering of a voltage and the like. The reactor of the embodiment is a large-capacity reactor used in a driving system of a hybrid vehicle and an electric vehicle and the like, for example. The reactor is a major component of a booster circuit mounted on these vehicles.

The reactor comprises: an annular core 10 formed by including a magnetic body; a resin member 20 covering a periphery of the annular core 10; and a coil 5 attached to an outer circumference of the resin member 20 so as to cover a part of the annular core 10.

Moreover, the reactor is provided with a temperature sensor 9 for detecting its internal temperature. That is, a gap is provided between the resin member 20 and the coil 5, and the temperature sensor 9 is inserted into the gap. The temperature sensor 9 is formed by a columnar temperature detection portion 9a and a lead wire 9b connected to the temperature detection portion 9a, and the temperature detection portion 9a is arranged along a winding shaft direction of the coil 5, and a rear end of the temperature detection portion 9a is exposed to an outside of the coil 5.

The resin member 20 is provided with three fixing portions 31, and the reactor is mounted and fixed to a base by screwing via the fixing portions 31. As for the base, a PCU case, a mission case, a voltage control unit case or a heat sink can be cited, but they are not limited as long as the reactor is mounted to the target.

[1-2. Detailed Structure]

Detailed structure of each portion of the reactor of the embodiment will be described by using FIGS. 1 to 6. In this description, in explanation of structure of each member, a z-axis direction illustrated in FIG. 1 refers to an "upper" side, a direction opposite to that to a "lower" side, or a "lower" is also referred to as "bottom" in some cases. The z-axis direction is a vertical direction of the reactor and is also a height direction of the reactor.

(Annular Core)

The annular core 10 has, as illustrated in FIG. 2, an annular shape with a rectangular outer shape. As illustrated in FIGS. 1 and 2, a linear portion around which the coil 5 is wound to is a leg portion where a magnetic flux is generated. A connection portion of the linear portion around where the coil 5 is not wound is a yoke portion which the magnetic flux generated in the leg portion passes through. That is, the yoke portion connects a pair of linear portions. In the annular core 10, an annular closed magnetic circuit is formed by the magnetic flux generated in the leg portion passing through the yoke portion.

The annular core 10 has a plurality of core members 11 to 13 and a plurality of spacers 14 as illustrated in FIG. 2, and the spacer 14 is arranged between the core members 13 and connected by an adhesive to be annular.

The core members 11 to 13 are formed of magnetic bodies such as powder magnetic cores, ferrite cores or laminated steel plates. Here, the core members 11 to 13 are powder magnetic cores. The core members of the embodiment are a plurality of I-shaped cores 13 forming right and left leg portions and two block-shaped cores 11 and 12 forming the yoke portion. All the core members 11 to 13 have substantially cuboid shapes but their widths, that is, lengths in a y-axis direction are different, and the block-shaped cores 11 and 12 are longer than the I-shaped cores 13.

The spacer 14 is a plate-shaped gap spacer. The spacer 14 is arranged between the core members 13 and is bonded and fixed to connection surfaces of the core members 13 on both sides of the spacer 14 by an adhesive.

The spacer 14 gives a magnetic gap of a predetermined width to between the core members 13 and prevents the reduction of inductance of the reactor. As the material of the spacer 14, a non-magnetic body, ceramic, non-metal, a resin, a carbon fiber or a synthetic material of two kinds or more of them or a gap paper can be used. The spacer 14 does not necessarily have to be provided.

(Resin Member)

The resin member 20 is a member covering the outer circumference of the annular core 10 by a resin. Therefore, the resin member 20 is formed annularly by following the shape of the annular core 10. That is, it has a pair of linear portions and a connection portion connecting these linear portions.

As a type of resin forming the resin member 20, an epoxy resin, an unsaturated polyester resin, a urethane resin, BMC (Bulk Molding Compound), PPS (Polyphenylene Sulfide), PBT (Polybutylene Terephthalate) and the like can be cited, for example.

In the embodiment, the resin member 20 is formed by being split into two parts and has a resin body 21 and a resin body 22. That is, the resin member 20 is formed by molding the substantially C-shaped resin body 21 and the substantially U-shaped resin body 22 separately in advance and by having their end portions facing each other. The resin body 21 and the resin body 22 are molded separately so that the I-shaped cores 13 forming the leg portions of the annular core 10 are accommodated in the resin bodies 21 and 22 before their end portions are faced with each other and the coil 5 is attached to the resin member 20 by fitting the coil 5 to the linear portions.

The resin body 21 has a pair of linear portions 21a and 21b, a connection portion 21c connecting the linear portions 21a and 21b, and wall portions 21d and 21e. The resin body 22 has the pair of linear portions 22a and 22b and the connection portion 22c connecting the linear portions 22a and 22b. A pair of linear portions is formed by abutting the linear portions 21a and 21b and the linear portions 22a and 22b to each other, and the linear portions are portions to which the coil 5 is attached and are also called bobbins. Here, the linear portions 22a and 22b are longer than the linear portions 21a and 21b, but it is not limited as long as the pair of linear portions is formed.

Inside the connection portions 21a and 22c, the block-shaped cores 11 and 12 are embedded by a molding method.

In other words, the connection portions 21c and 22c are covering portions of the block-shaped cores 11 and 12, and the outer circumferential portions of the block-shaped cores 11 and 12 covered by the connection portions 21c and 22c are in close contact with inner circumferences of the connection portions 21c and 22c. However, connection portions of the block-shaped cores 11 and 12 connected to the I-shaped core 13 are exposed.

Inside the linear portions 22a and 22b, the I-shaped cores 13 and the spacer 14 are alternately laminated and arranged along a linear direction of the annular core 10. Opening portions are provided at tips of the linear portions 21a and 21b and the linear portions 22a and 22b, the I-shaped cores 13 and the spacer 14 are inserted through the opening portions of the linear portions 22a and 22b, and the I-shaped cores 13 protruding from the linear portions 22a and 22b are covered by the linear portions 21a and 21b.

The wall portions 21d and 21e are flat plate-shaped members provided on an upper part of the connection portion 21c at a boundary between the connection portion 21c and the linear portions 21a and 21b so as to face an end portion of the coil 5. That is, the wall portions 21d and 21e are arranged on a yz-plane on the upper part of the connection portion 21c and are bonded to a wire final turn portion of the coil 5. The bonding to the portion may be carried out by using an adhesive or by using a self-fusion layer of the coil 5 which will be described afterwards. The coil 5 does not necessarily have to be bonded to the walls 21d and 21e. In the upper part of the connection portion 21c, the wall portion 21d is provided on the linear portion 21a side, and the wall portion 21e is provided on the linear portion 21b side.

Moreover, between the wall portions 21d and 21e and the connection portion 21c, reinforcing ribs 21f extending to a side opposite to the coil 5 are provided at predetermined intervals. Here, a notch 21g is provided in the rib 21f located at an end of the wall portion 21e, and the lead wire 9b of the temperature sensor 9 is inserted through the notch 21g.

Figure 3:
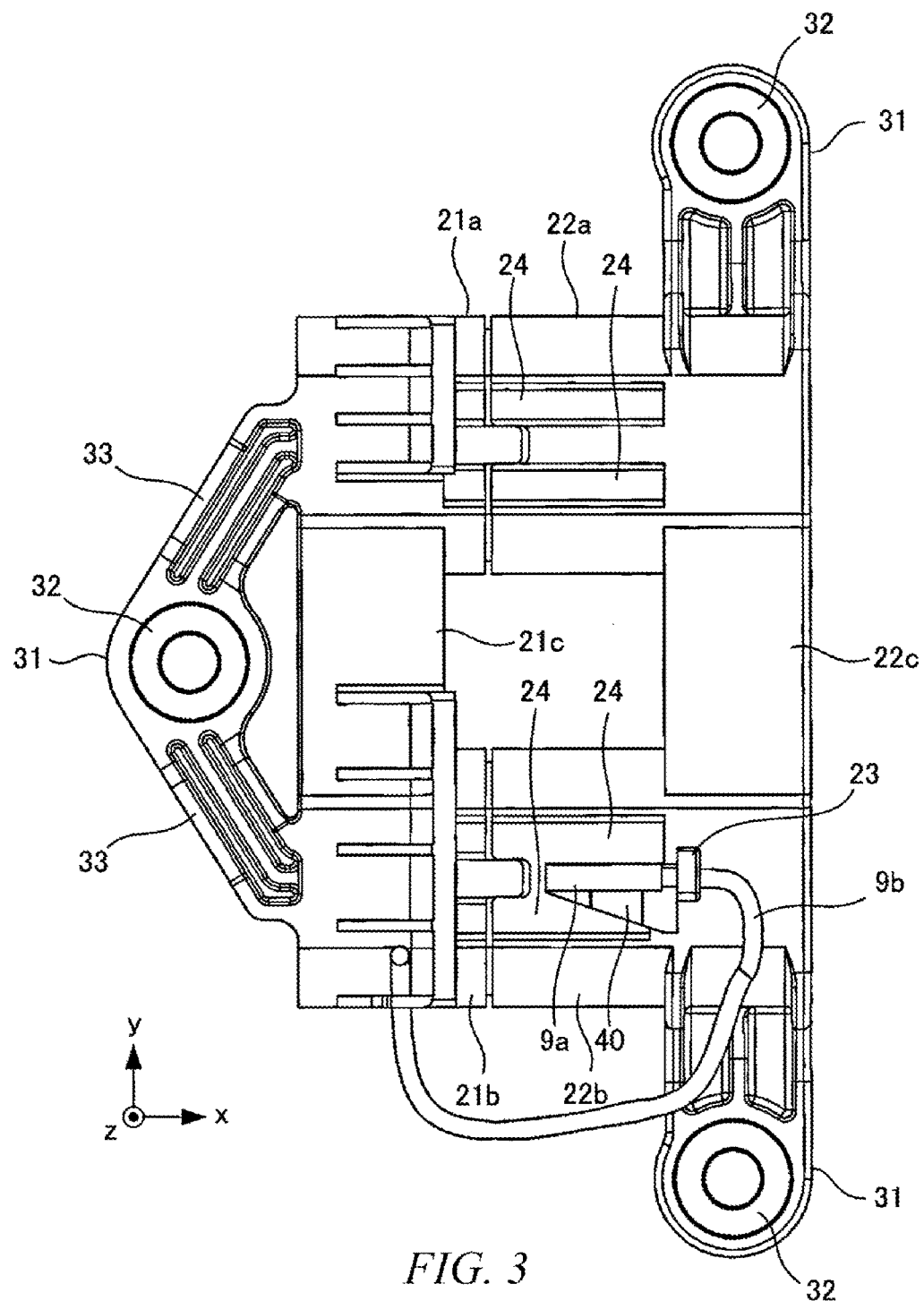
FIG. 3 is a plane view of the reactor according to the first embodiment except a coil.
Figure 4:
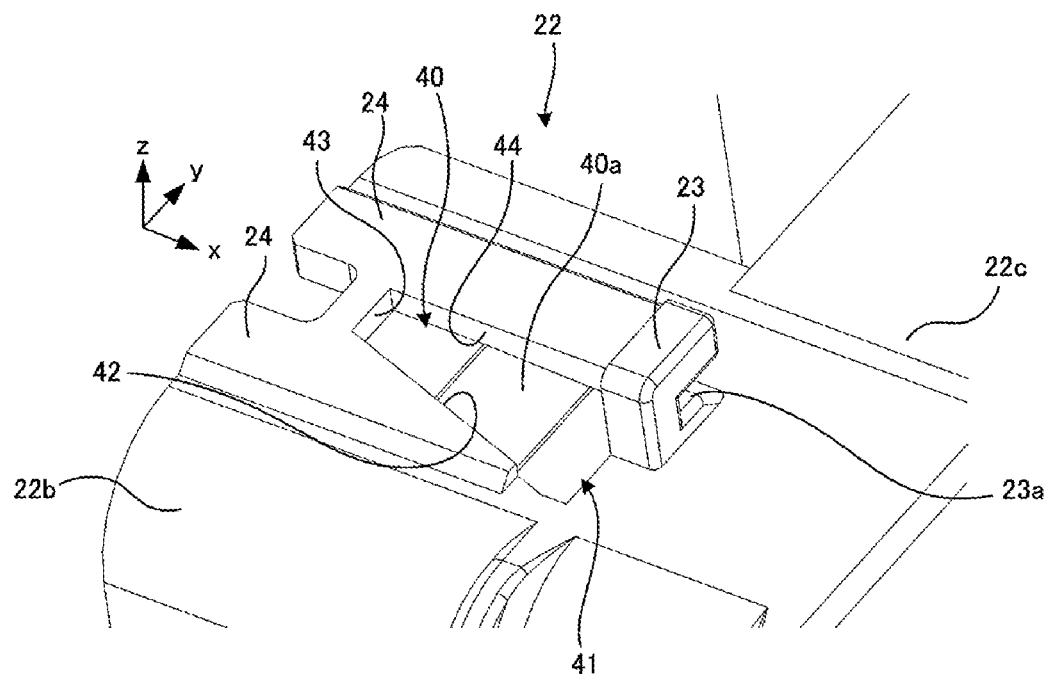
FIG. 4 is a partially enlarged perspective view around a recess portion.
Figure 5:
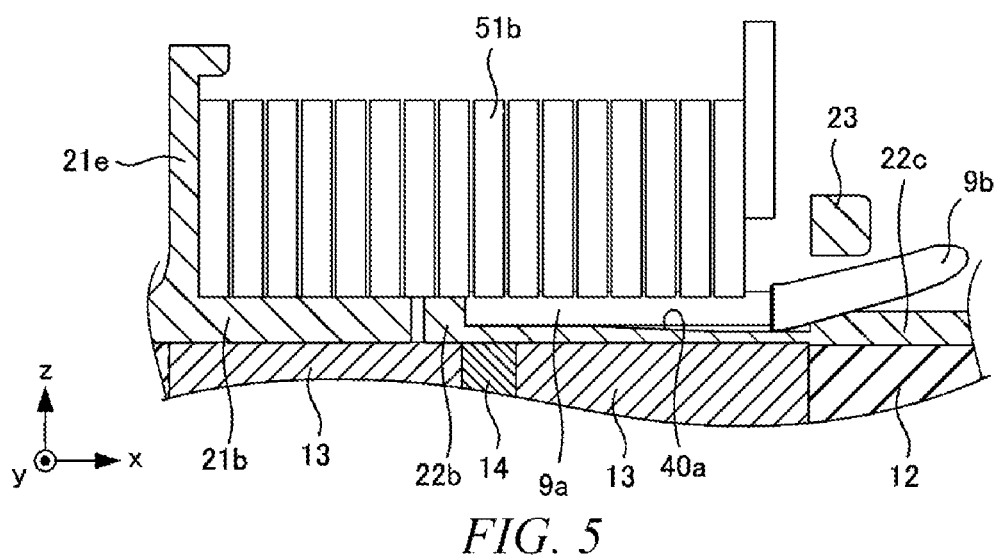
FIG. 5 is an A-A sectional view of FIG. 1.

FIG. 3 is a plane view of the reactor according to this embodiment except the coil 5. FIG. 4 is a partially enlarged perspective view around a recess portion. FIG. 5 is an A-A sectional view of FIG. 1. As illustrated in FIGS. 3 and 4, the resin member 20 is provided with: the recess portion 40 in which the temperature sensor 9 is arranged; a locking portion 23 arranged coaxially with the temperature detection portion 9a and on a rear end side of the temperature detection portion 9a and protruding from a surface of the resin member 20; and a spacer 24 regulating a distance with respect to the coil 5. Here, the temperature detection portion 9a has a flat square-columnar shape.

The spacer 24 is a portion raised from surfaces of the linear portions 21a, 21b, 22a, and 22b and on which the inner circumferential surface of the coil 5 abuts so as to keep distances between the inner circumferential surface of the coil 5 and the linear portions 21a, 21b, 22a, and 22b. Here, the spacers 24 are provided in two pieces in an x-axis direction on upper surfaces of the linear portions 21a, 21b, 22a, and 22b.

The recess portion 40 is a recessed portion dented by one stage from the periphery in the resin body 22, has an inner circumferential surface and a bottom surface, and is provided on the upper surfaces of the linear portion 22b and the connection portion 22c. Here, the recess portion 40 is provided at a spot on the upper surface of the resin body 22 where the spacer 24 is provided.

The recess portion 40 has a trapezoidal shape as a whole, and as illustrated in FIG. 3, has a shape in which a depth side in the gap is narrower than the locking portion 23 side. The term "depth" here refers to a side the tip of the temperature detection portion 9a is to be arranged to than the locking portion 23 side.

Regarding outline structure of the recess portion 40, an upper side and a lower side of the trapezoid are both orthogonal to a winding axis direction (x-axis direction) of the coil 5, and a length of the upper side is shorter than the length of the lower side. The upper side of the trapezoid is positioned at a center part on the upper surface of the linear portion 22b, while the lower side of the trapezoid is positioned on the upper surface of the connection portion 22c. On the other hand, one of the other pair of sides of the trapezoid extends in the x-axis direction, and the other side is inclined diagonally to said direction.

The recess portion 40 will be described in more detail. The recess portion 40 has an insertion port 41 through which the temperature sensor 9 is to be inserted. The insertion port 41 is provided adjacent to the locking portion 23. In other words, a part of the lower side of the recess portion 40 is occupied by the locking portion 23, while the other remaining portion is empty, and the remaining portion is the insertion port 41. The temperature detection portion 9a is inserted through the insertion port 41 to the depth between the coil 5 and the recess portion 40.

The inner circumferential surface of the recess portion 40 has an insertion guide 42 for the temperature sensor 9, a tip position regulating portion 43 having a shape following a tip shape of the temperature detection portion 9a, and a side-part position regulating portion 44 having a shape following a one-side side part of the temperature detection portion 9a.

The insertion guide 42 is a portion of a diagonal side inclined diagonally to the x-axis direction of the recess portion 40 having a trapezoidal shape in the inner circumferential surface of the recess portion 40 and here, it extends from the insertion port 41 to the tip position regulating portion 43. The insertion guide 42 guide the tip of temperature detection portion 9a to its arrangement position. As illustrated in FIG. 1, the insertion port 41 and a part of the insertion guide 42 are exposed from the outside of the coil 5 so that a spot where the temperature sensor 9 is to be inserted can be visually recognized when the temperature sensor 9 is to be attached.

The tip position regulating portion 43 is the inner circumferential surface of the recess portion 40 in contact with a tip surface of the temperature detection portion 9a and corresponds to an upper side portion of the trapezoidal shape of the recess portion 40. The side-part position regulating portion 44 opposes to the insertion guide 42, is the inner circumferential surface of the recess portion 40 along the side surface of the temperature detection portion 9a and corresponds to a side portion along the x-axis direction of the trapezoidal shape of the recess portion 40.

As illustrated in FIG. 5, the bottom surface of the recess portion 40 has inclination 40a which gradually decreases a gap with respect to the coil 5 from the insertion port 41 side toward the tip position regulating portion 43 side. The largest gap on the insertion port 41 side is slightly larger than a diameter of the temperature detection portion 9a, that is, a thickness in the x-axis direction, but the gap gets smaller as it goes to the depth from here and is slightly smaller than the thickness of the temperature detection portion 9a on the tip portion.

Here, the phrase "slightly smaller" is a gap to such a degree that the temperature detection portion 9a can be inserted with light press-fitting, for example. In other words, it is no problem if the tip portion for detecting the temperature in the temperature detection portion 9a is at least in contact with the coil 5 and in this embodiment, the tip portion of the temperature detection portion 9a is in planar contact. Thus, the tip portion of the temperature detection portion 9a is sandwiched in close contact with the bottom surface of the recess portion 40 and the inner circumferential surface of the coil 5. The contact between the temperature detection portion 9a and the inner circumferential surface of the coil 5 may be in point contact.

The locking portion 23 is a protruding portion provided adjacent to the recess portion 40 by protruding on the upper surface of the connection portion 22c and is arranged coaxially with the temperature detection portion 9a. The locking portion 23 regulates position shifting of the temperature detection portion 9a in an extending direction by contact between a projecting part from the connection portion 22c and the rear end portion of the temperature detection portion 9a. The locking portion 23 is slightly distant from the rear end of the temperature detection portion 9a, but this is because a dimensional tolerance in the extending direction of the temperature detection portion 9a is considered.

Here, the locking portion 23 is a hook having a C-shape as a whole, and a notch 23a is provided in the hook on a side opposite to the insertion port 41. Moreover, the lead wire 9b is inserted into the notch 23a of the hook. One surface of the hook opposing the rear end of the temperature detection portion 9a abuts on the lead wire 9b and regulates the position of the temperature detection portion 9a in the x-axis direction. Alternatively, the lead wire 9b rides over the inner circumferential surface of the hook forming the notch 23a so that the hook abuts on the lead wire 9b and regulates the position of the temperature detection portion 9a in the x-axis direction. In other words, a portion from the bottom surface of the recess portion 40 to the notch 23a makes a step, over which the lead wire 9b rides, whereby the position of the temperature detection portion 9a in the x-axis direction is regulated.

The resin member 20 has the fixing portions 31 for fixing the reactor to the base which is an installation spot. In the fixing portion 31 a cylindrical collar 32 made of metal is embedded, and the reactor is fixed to the base by inserting a screw or a rivet into a hole of the collar 32.

The number of fixing portions 31 is not particularly limited, but here, the number of the fixing portions 31 is three, and one of them is provided on a side part of the connection portion 21c of the resin body 21 and the remaining two are provided on the side part of the connection portion 22c of the resin body 22 so that each is positioned at each apex of a rectangular triangle.

The fixing portion 31 on the connection portion 21c side is relatively movable with respect to the fixing portion 31 on the connection portion 22c side. That is to absorb a linear expansion difference of the reactor. That is, in this embodiment, in the x-axis direction, there are different members such as the spacer 14 provided on the annular core 10, the adhesive, the resin member 20 and the like, and their linear expansion factors are different and thus, the linear expansion difference can occur most easily in the x-axis direction.

Therefore, the fixing portion 31 on the connection portion 22c side is set as an immovable-side fixing portion and the other fixing portion 31 on the connection portion 21c side as a movable-side fixing portion. Specifically, the two fixing portions 31 on the connection portion 22c side are molded integrally with the resin of the connection portion 22c and provided by protruding in the y-axis direction in the middle of the connection portion 22c side part.

On the other hand, the fixing portion 31 on the connection portion 21c side is supported by two supporting arms 33 from the side part of the connection portion 21c. That is, the supporting arms 33 have their tips connected so as to forma triangle from the side part of the connection portion 21c, and the movable-side fixing portion is provided on the tip portion. Thus, a space portion is formed between the side wall of the connection portion 21 and the two supporting arms 33. By this space portion, the supporting arms 33 are deflected to the x-axis direction, the movable-side fixing portion moves to the x-axis direction, and the linear expansion difference is absorbed.

The supporting arms 33 are formed by two plate-shaped members arranged with an interval from each other. In this embodiment, the movable-side fixing portion is located at the center part of the height of the reactor, and the two plate-shaped members form a triangle which narrows from the connection portion 21 side part side toward the movable-side fixing portion side and fix the movable-side fixing portion to the z-axis direction.

The resin bodies 21 and 22 are members integrally molded by a resin. That is, the linear portions 21a and 21b, the connection portion 21c, the wall portions 21d and 21e, the ribs 21f, the supporting arms 33 and the fixing portion 31 forming the resin body 21 are continuously formed without a joint. The linear portions 22a and 22b, the connection portion 22c, the locking portion 23, and the fixing portion 31 forming the resin body 22 are similarly continuously formed without a joint.

(Coil)

The coil 5 has a wire rod made of metal and a self-fusion layer formed on a surface of the wire rod. In this embodiment, the wire rod is a flat wire and the coil 5 is an edgewise coil. The self-fusion layer is an insulating layer and is made of a resin, here.

Specifically, in the self-fusion layer, a thermosetting resin in a semi-hardened state is heated and melted, and adjacent parts of the wire rod is bonded by the self-fusion layer, whereby the wire rod is integrated. Therefore, an inner circumferential surface of the coil 5 form ing an air core portion of the coil 5 is substantially a flat surface so as to enlarge a contact area with the flat temperature detection portion 9a and to be able to be in contact with the temperature detection portion 9a more reliably.

As the resin forming the self-fusion layer, an epoxy resin, a phenol resin, a polyimide resin and the like can be used. A wire rod and a coiling method of the coil 5 are not limited to the edgewise coil of a flat wire but may be in other forms.

The coil 5 has a pair of left and right coils 51a and 51b, and one end portions thereof are connected by a connecting line 51c which is made of the same material as those of the coils 51a and 51b. The coils 51a and 51b are constituted by one copper wire insulated/covered by enamel or the like. The coil 5 is attached to outer circumferences of the pair of linear portions of the resin member 20 so as to surround the periphery of the leg portions of the annular core 10 on the air core portions of the coils 51a and 51b, and the coils 51a and 51b are in parallel with each other. That is, winding axis directions of the coils 51a and 51b are in parallel with each other.

An end portion 52a of the coil 51a is pulled out through an upper side of the connection portion 21c of the resin body 21 and an end portion 52b of the coil 51b is pulled out through the side of the resin body 21 to the outside of the reactor, respectively, and they are connected to a wiring of an external device such as an external power supply. When power is supplied from the external power supply, a current flows through the coils 51a and 51b and a magnetic flux penetrating the coils 51a and 51b is generated, and an annular closed magnetic circuit is formed in the annular core 10.

(Temperature Sensor)

The reactor is provided with the temperature sensor 9. The temperature sensor 9 detects a temperature inside the reactor. As the temperature sensor 9, a thermistor whose electric resistance is changed with respect to a temperature change can be used, for example, but it is not limited.

The temperature sensor 9 is formed by the temperature detection portion 9a and the lead wire 9b connected to the temperature detection portion 9a. In the temperature detection portion 9a, a temperature detection element is embedded in its tip portion, for example, and the temperature inside the reactor is detected by the tip portion. As illustrated in FIG. 5, the tip portion of the temperature detection portion 9a is located at a center of the length in the winding axis direction of the coil 51b. That is because the center of the coil 51b is a spot where the heat can be retained the most. Moreover, the tip portion of the temperature detection portion 9a is also located above the spacer 14. That is because this is a spot where heat generation of the coil 51b becomes the most by an eddy current loss generated at a center part since a leakage magnetic flux generated in the portion of the spacer 14 which is a gap penetrates the center part of the coil 51b. The shape of the temperature detection portion 9a is a flat square-columnar shape, here, but only needs to be columnar such as cylindrical columnar, oval columnar, triangle columnar, square columnar or the like.

The lead wire 9b transmits temperature information detected by the temperature detection portion 9a to the outside of the reactor. Specifically, the lead wire 9b is pulled out through the notch 23a and inserted through the notch 21g provided in the rib 21f of the wall portion 21e via the upper side of the coil 51b and is connected to an external device or circuit. Examples of such external devices or circuits include a control circuit which turns on/off a current flowing through the coils 51a and 51b.

[1-3. Mounting of Temperature Sensor]

Figure 6:
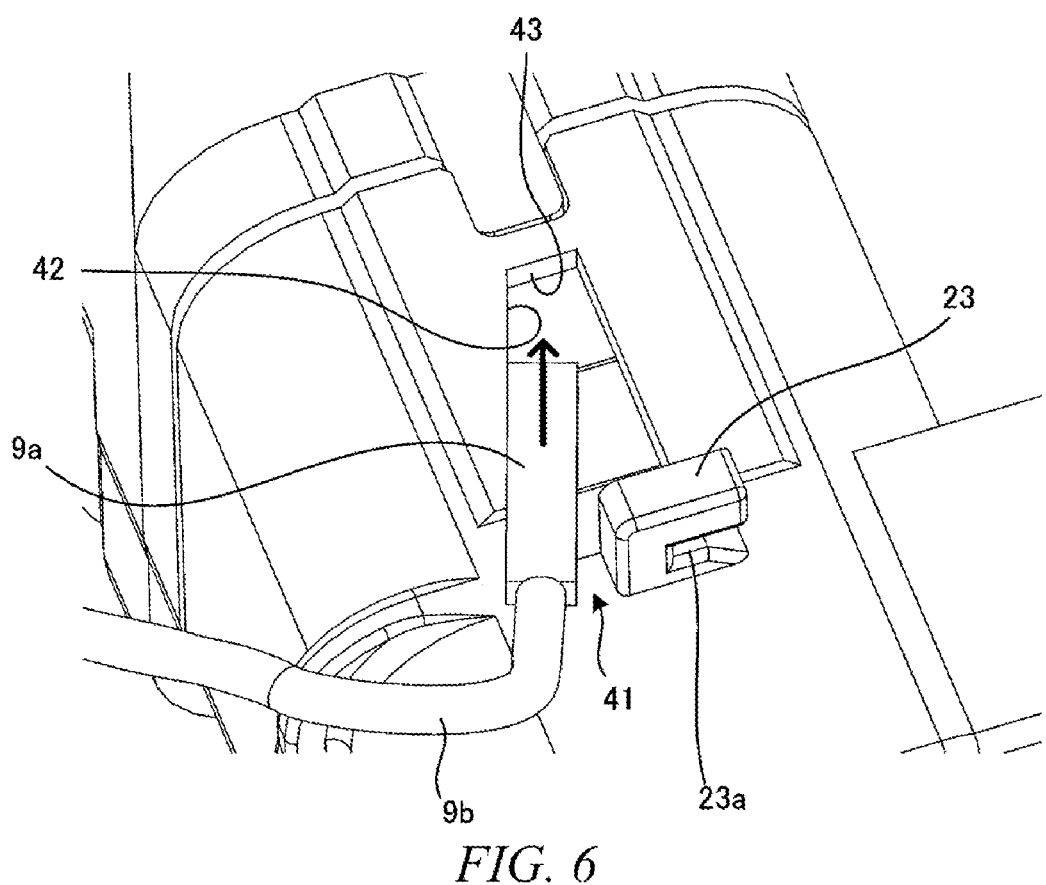
FIG. 6 is a view for explaining a mounting method of a temperature sensor and a perspective view around the recess portion in an initial stage.
Figure 7:
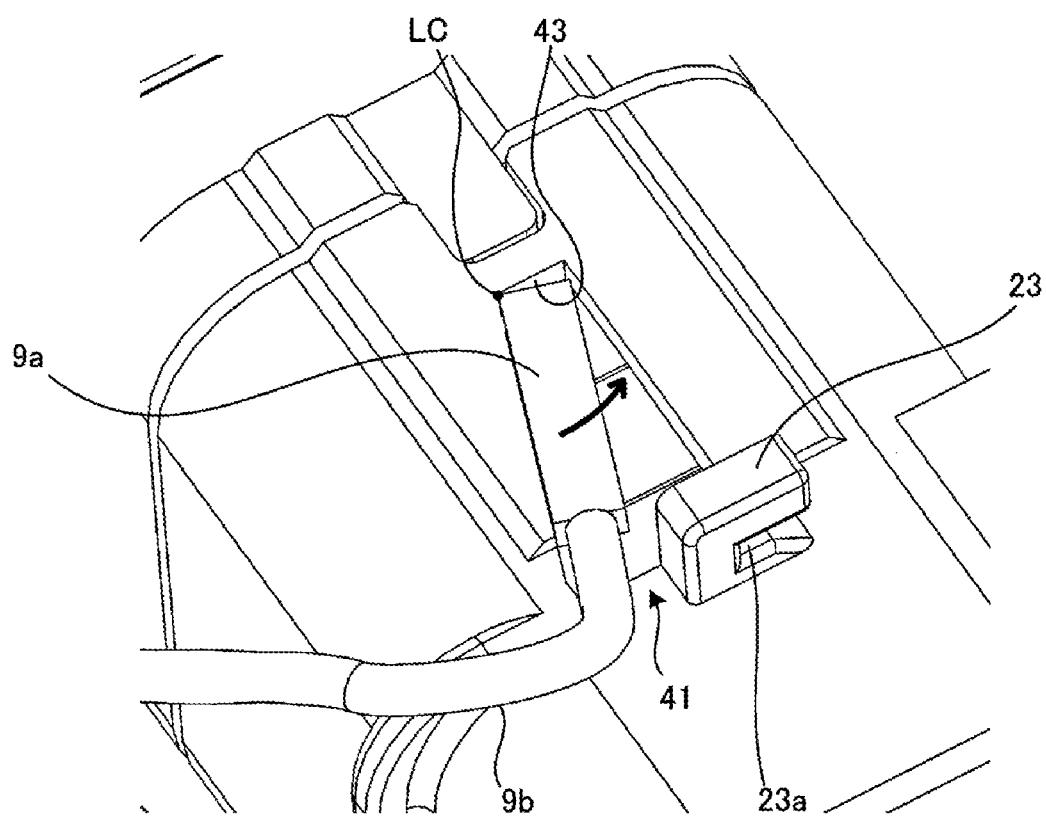
FIG. 7 is a view for explaining the mounting method of the temperature sensor and a perspective view around the recess portion in a middle stage.
Figure 8:
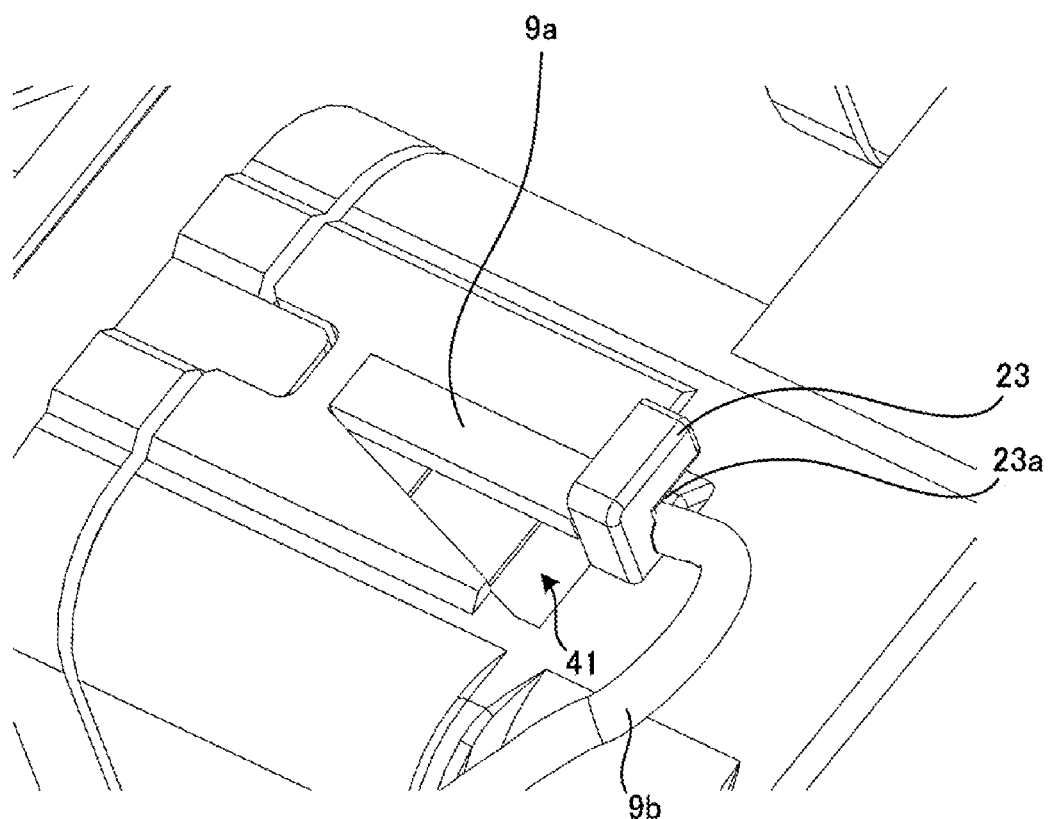
FIG. 8 is a view for explaining the mounting method of the temperature sensor and a perspective view around the recess portion in a final stage.

Subsequently, a mounting method of the temperature sensor 9 will be described by using FIGS. 6 to 8. In FIGS. 6 to 8, the coil 51b is omitted for explanation, but it is regarded that each member except the temperature sensor 9 has been already assembled. That is, it is regarded that the coil 5 is attached to the outer circumference of the resin member 20 in advance.

First, the temperature detection portion 9a is inserted into a gap between the coil 51b and the bottom surface of the recess portion 40 through the insertion port 41. At this time, as illustrated in FIG. 6, the side surface of the temperature detection portion 9a is inserted into the depth along the insertion guide 42 on the inner circumferential surface of the recess portion 40. When it has been inserted to the depth, as illustrated in FIG. 7, a corner on the left side of the tip of the temperature detection portion 9a abuts on a corner LC on the left side (negative side in the y-axis direction) of the tip position regulating portion 43. Then, the lead wire 9b is lifted above the reactor and pulled out to the hook opening side of the locking portion 23.

As a result, the temperature detection portion 9a rotates by itself around the corner LC so as to be in parallel with the winding axis direction (x-axis direction) of the coil 51b, and the tip of the temperature detection portion 9a follows the tip position regulating portion 43 and the side-part position regulating portion 44. In other words, since the tip position regulating portion 43 and the side-part position regulating portion 44 follow the shape of the temperature detection portion 9a, an inevitable action of hooking the lead wire 9b by the hook of the locking portion 23 opened on the side opposite to the insertion port 41 contributes to positioning of the temperature detection portion 9a.

Finally, as illustrated in FIG. 8, the lead wire 9b is passed through the notch 23a through the opening of the locking portion 23. The z-axis direction of the temperature detection portion 9a has its position regulated by the coil 51b and the bottom surface of the recess portion 40, and the x-axis direction of the temperature detection portion 9a has its position longitudinally regulated by the tip position regulating portion 43 and the locking portion 23. The y-axis direction of the temperature detection portion 9a has its position regulated by the side-part position regulating portion 44 and the tip position regulating portion 43. The y-axis direction has its position regulated also by the lead wire 9b hooked by the hook of the locking portion 23.

[1-4. Action/Effect]

(1) The reactor of this embodiment comprises: the annular core 10; the resin member 20 covering the periphery of the annular core 10; the coil 5 attached to the outer circumference of the resin member 20; and the temperature sensor 9 inserted into the gap between the resin member 20 and the coil 5. The temperature sensor 9 has the columnar temperature detection portion 9a, and at least a part of the temperature detection portion 9a is sandwiched by the resin member 20 and the coil 5 in close contact.

As a result, since the temperature sensor 9 is inserted into the gap between the resin member 20 and the coil 5, a member for holding the temperature sensor 9 does not have to be provided separately, which results in size reduction, and the temperature detection portion 9a can be fixed to the position where it is in contact with the coil 5 at all times, and accurate temperature detection can be performed.

Conventionally, a method of reinforcing a holding strength of the temperature sensor by accommodating the reactor in a case and by filling and solidifying a filler to immerse the temperature sensor in the case, is known. With this method, by interposing the filler, the temperature is detected even if the temperature sensor is not in direct contact with the coil. However, even if such filler is not available, accurate temperature detection can be made.

(2) The resin member 20 is provided with the recess portion 40 in which the temperature detection portion 9a is arranged. As a result, the temperature detection portion 9a does not have to protrude further from the resin member 20 as the portion of the recess of the recess portion 40, therefore the reactor size can be reduced.

(3) The recess portion 40 has a shape that is wider in the side where the temperature detection portion 9a is inserted and is hollowed to the depth side. As a result, the temperature sensor 9 can be inserted into the gap between the recess portion 40 and the coil 5 easily.

(4) The recess portion 40 has the insertion port 41 through which the temperature sensor 9 is inserted, and the inner circumferential surface of the recess portion 40 is provided with the insertion guide 42 for the temperature sensor 9 continuously from the insertion port 41 in order to guide the tip of the temperature detection portion 9a to a position the tip of the temperature detection portion is to be arranged to. As a result, work efficiency of when the temperature sensor 9 is inserted into the gap between the resin member 20 and the coil 5 can be improved.

(5) The inner circumferential surface of the recess portion 40 is provided with the tip position regulating portion 43 having the shape following the tip of the temperature detection portion 9*a*. As a result, since the tip portion of the temperature detection portion 9*a* is accurately positioned, an accurate temperature can be detected. Moreover, in combination with the locking portion 23, since the position of the temperature detection portion 9*a* in the extending direction is regulated, falling off of the temperature sensor 9 can be prevented.

(6) The insertion guide 42 is extended from the insertion port 41 to the tip position regulating portion 43. As a result, the temperature detection portion 9*a* can be easily inserted to the depth, and the temperature sensor 9 can be positioned easily and thus a mounting workability of the temperature sensor 9 can be improved.

(7) The insertion port 41 and a part of the insertion guide 42 are exposed to the outside of the coil 51*b* attached to the outer circumference of the resin member 20. As a result, when the temperature sensor 9 is to be inserted, the insertion spot can be visually recognized, and thus the mounting workability can be improved.

(8) On the bottom surface of the recess portion 40, the inclination 40*a* is provided which gradually decreases the gap from the insertion port 41 side toward the tip position regulating portion 43 side. As a result, the insertion of the temperature detection portion 9*a* is facilitated, so that the workability is improved, and since the position of the tip portion of the temperature detection portion 9*a* can be reliably fixed, further accurate temperature detection can be performed.

(9) The temperature sensor 9 has the lead wire 9*b* connected to the rear end of the temperature detection portion 9*a*, and in the resin member 20, the protruding portion opposing to the rear end of the temperature detection portion 9*a* and protruding higher than the bottom surface of the recess portion 40 is provided, and the lead wire 9*b* abuts to the protruding portion. Particularly, in this embodiment, as the protruding portion, on the surface of the resin member 20, the hook is arranged coaxially with the temperature detection portion 9*a* and on the rear end side of the temperature detection portion 9*a*, the notch 23*a* which the lead wire 9*b* is passed through is provided in the hook, and the lead wire 9*b* abuts on the inner circumferential surface of the hook constituting the notch 23*a*. As a result, since a step is formed from the bottom surface of the recess portion 40 to the notch 23*a*, the position of the temperature detection portion 9*a* is regulated in the axial direction (x-axis direction), and falling off of the temperature sensor 9 from the gap between the recess portion 40 and the inner circumferential surface of the coil 51*b* is made difficult. That is, when the temperature sensor 9 is mounted in the final stage in an assembling process of the reactor, the temperature sensor 9 can be inserted into the gap between the resin member 2 and the coil 5, but on the other hand, a possibility of the temperature sensor 9 falling off is involved and there is a concern that accurate temperature detection cannot be made, but since the locking portion 23 is provided on the same straight line with the temperature detection portion 9*a*, such situation can be prevented.

(10) The insertion port 41 is provided adjacent to the hook, the notch 23*a* is provided on the side opposite to the insertion port 41, the lead wire 9*b* is passed through the notch 23*a*, and the side-part position regulating portion 44 opposing to the insertion guide 42 and having the shape following the side part of the temperature detection portion 9*a* is provided on the inner circumferential surface of the recess portion 40.

As a result, even if insertion of the temperature sensor 9 is possible, its falling off can be prevented. Since the position of the temperature sensor 9 is regulated in the direction (x-axis direction) orthogonal to the extending direction of the temperature detection portion 9*a* by the side-part position regulating portion 43 and the hook, falling off of the temperature sensor 9 from the gap between the resin member 20 and the coil 5 through the insertion port 41 can be prevented.

(11) The resin member 20 is provided with, on the surface where the coil 5 is attached, the spacer 24 on which the inner circumferential surface of the coil 5 abuts to keep a distance with respect to the coil inner circumferential surface, and the recess portion 40 is provided on the spacer 24. As a result, since the distance between the surface of the resin member 20 around the recess portion 40 and the coil inner circumferential surface is accurately kept by the spacer 24, the temperature detection portion 9*a* can be brought into contact with the coil 5 more reliably.

(12) The coil 5 has a wire rod and a self-fusion layer formed on a surface of the wire rod so that adjacent parts of the wire rods are bonded by the self-fusion layer. As a result, the contact area with the temperature detection portion 9*a* can be increased, and accurate temperature detection can be realized more easily.

(13) The tip portion of the temperature detection portion 9*a* is arranged to be located at the center of the length in the winding axis direction of the coil 51*b*. As a result, the temperature at the center of the coil 51*b* where the heat is retained the most can easily be detected, and conduction control of the reactor can be executed with detection data with the most strict temperature condition, and a power loss can be lowered.

That is, there is a proportional relationship between the internal temperature and the power loss of the reactor, and if the internal temperature is high, more power is consumed. That is because resistivity of the wire rod of the coil 51*b* and the temperature have a proportional relationship. Therefore, if the temperature detection portion 9*a* is arranged at a spot where a temperature is low, a temperature lower than an actual highest temperature is detected, accurate conduction control cannot be executed, and generation of excess power loss cannot be prevented. On the other hand, in the reactor of the present disclosure, since the tip portion of the temperature detection portion 9*a* is installed at a spot where the temperature becomes the highest, accurate temperature detection and conduction control can be executed, and generation of wasteful power loss can be prevented. For example, if it is applied to vehicles such as an electric vehicle, a fuel cell vehicle, a hybrid vehicle and the like, it has an advantage that fuel efficiency can be improved.

(14) The annular core 10 has the plurality of core members 13 and the spacer 14 inserted between the core members 13, and the tip portion of the temperature detection portion 9*a* is arranged above the spacer 14. As a result, the temperature can be detected at a spot where a leakage magnetic flux is large and heat generation of the core becomes larger, which is effective if the temperature becomes the highest at the spot.

2. Other Embodiments

The present disclosure is not limited to the first embodiment and includes other embodiments described below. Moreover, the present disclosure also includes aspects combining all or any of the first embodiment and the following other embodiments. Moreover, these embodiments can be omitted, replaced or changed in various ways within a range not departing from the disclosure and the variations are also included in the present disclosure.

(1) In the first embodiment, the leg portion of the annular core 10 has a substantially cuboid shape but it may be a columnar shape. In this case, the linear portions 21*a*, 21*b*, 22*a*, and 22*c* of the resin bodies 21 and 22 also have columnar shapes. Even in this case, the recess portion 40 can be provided.

(2) In the first embodiment, the recess portion 40 is provided on the upper surface of the resin body 22 but it may be provided on the side surface. Moreover, the recess portion 40 is provided on the resin body 22 but may be provided on the resin body 21 if the lengths of the linear portions 21*a* and 21*b* are longer than the length of the temperature detection portion 9*a*, for example.

(3) In the first embodiment, the temperature detection portion 9*a* is in an aspect that is merely sandwiched and fixed in the gap between the resin member 20 and the coil 5, but the temperature detection portion 9*a* may be further bonded to the self-fusion layer of the coil 5. As a result, fixing intensity of the temperature sensor 9 can be improved, and position shifting of the temperature detection portion 9*a* can be prevented.

Figure 9:
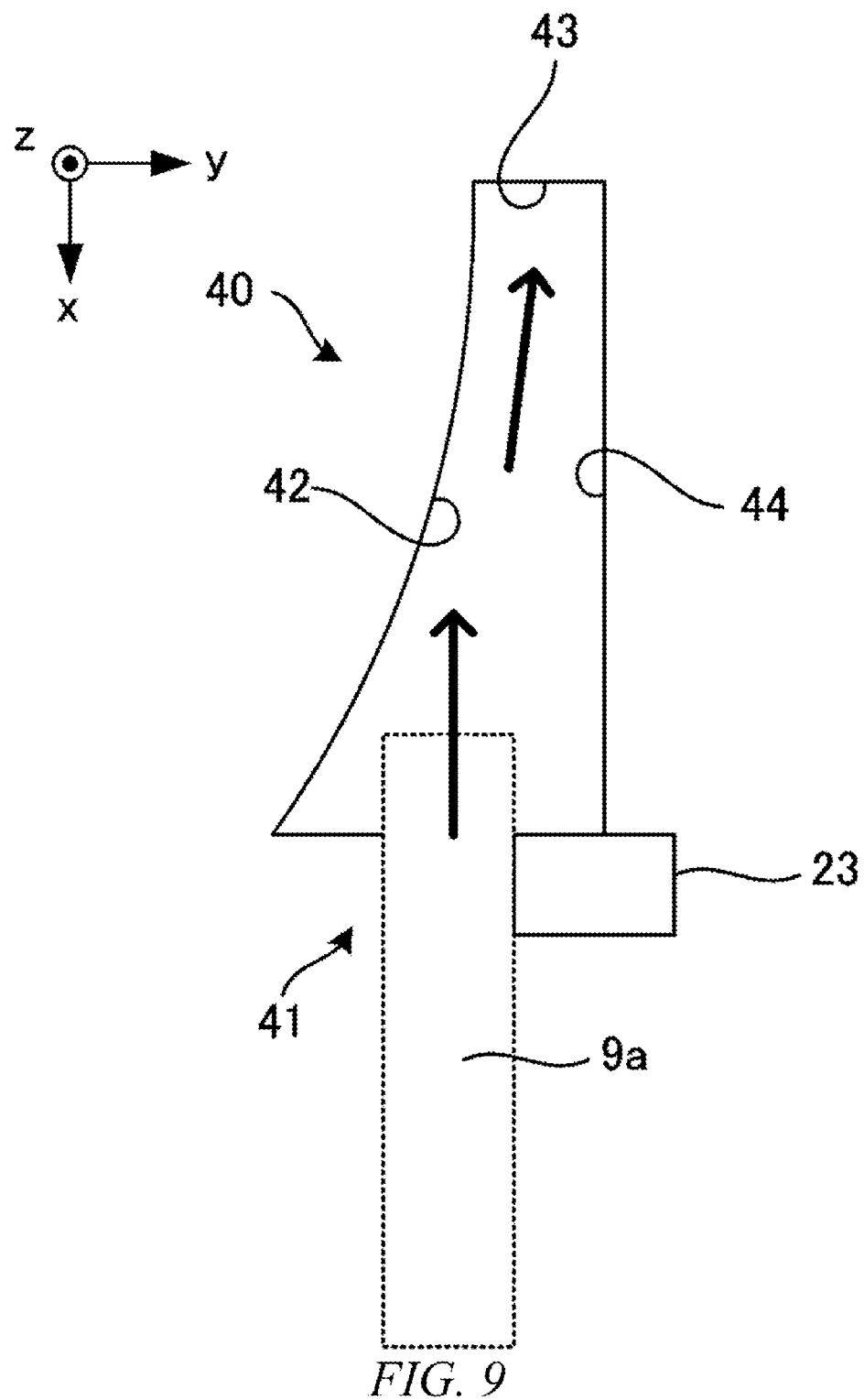
FIG. 9 is a plane view around the recess portion according to another embodiment.

(4) In the first embodiment, the insertion guide 42 extends linearly, but as illustrated in FIG. 9, it may be curved. In this case, the wall surface of the locking portion 23 on the insertion port 41 side may also be used as an insertion guide. By inserting the temperature detection portion 9*a* into the depth along the wall surface, the tip of the temperature detection portion 9*a* can be made to slide into the tip position regulating portion 43.

Figure 10:
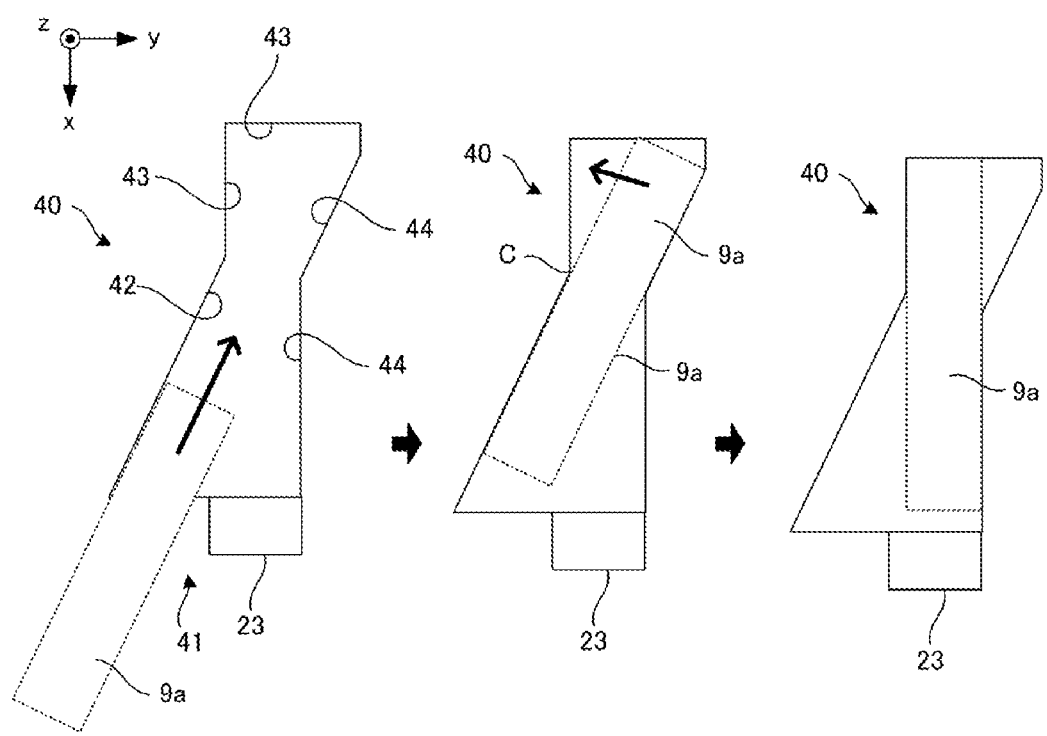
FIG. 10 are plane views around the recess portion according to another embodiment.

(5) In the first embodiment, the shape of the recess portion 40 is a trapezoidal shape, but as illustrated in FIG. 10, it may have a constricted portion which is wider on the locking portion 23 side and is gradually narrowed toward the depth, and moreover it may be formed to have a shape whose tip portion is widened again. That is, the tip side of the side-part position regulating portion 44 is in parallel with the insertion guide 42, the shape of the tip position regulating portion 43 has a shape following the tip surface and its side surface of the temperature detection portion 9*a*, and the portion following the side surface is in parallel with the side-part position regulating portion 44. In this way, too, the mounting workability of the temperature sensor 9 can be improved.

That is, as illustrated in the leftmost figure in FIG. 10, the temperature detection portion 9*a* is inserted into the depth along the insertion guide 42 through the insertion port 41, and the corner at the tip of the temperature detection portion 9*a* abuts on the tip position regulating portion 43. Here, a distance between the insertion guide 42 and the side-part position regulating portion 44 on the tip side is equal to a width of the temperature detection portion 9*a*.

When the lead wire 9*b* is hooked by a hook portion of the locking portion 23, as illustrated in a central figure in FIG. 10, the temperature detection portion 9*a* is rotated around a constricted portion C located on the side part of the temperature detection portion 9*a* and arrange the temperature detection portion 9*a* at a predetermined position. A rotation center of the temperature detection portion 9*a* is closer to the lead wire 9*b* side as compared with that in the first embodiment and thus, the temperature detection portion 9*a* can be rotated more easily, and the mounting workability of the temperature sensor 9 can be improved. Here, a distance between the tip position regulating portion 43 on the side part side of the temperature detection portion 9*a* and the side-part position regulating portion 44 on the locking portion 23 side is equal to the width of the temperature detection portion 9*a*.

Figure 11:
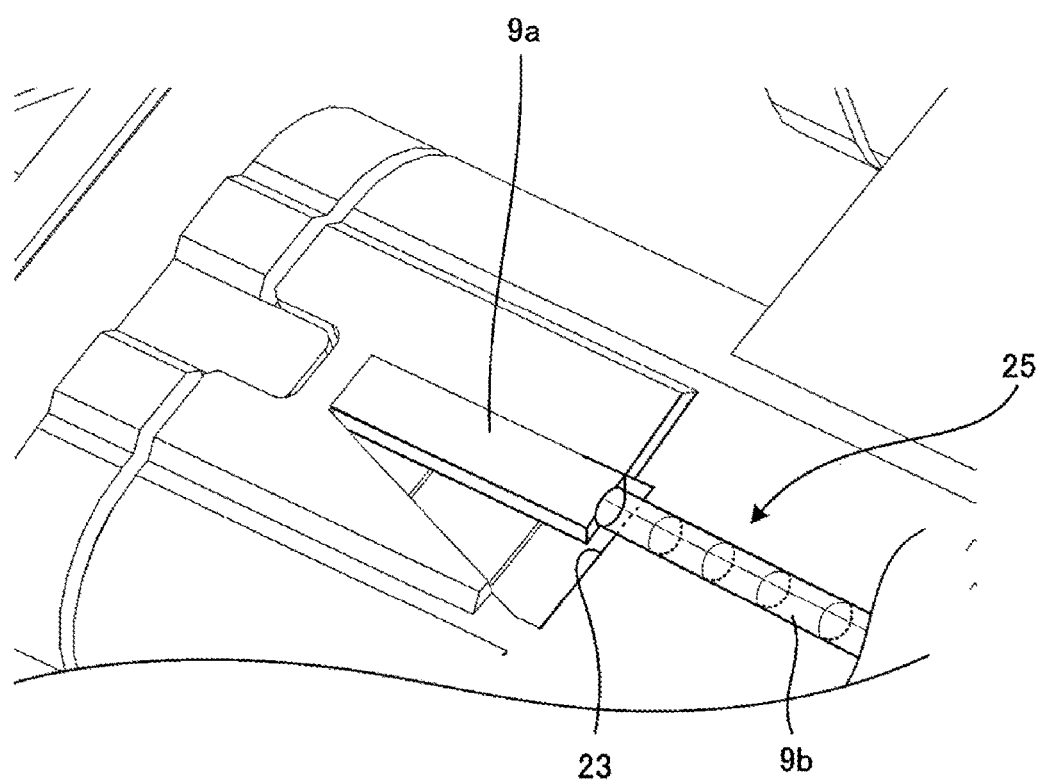
FIG. 11 is a view for explaining a locking portion according to another embodiment.

(6) In the first embodiment, the notch 23*a* is provided in the locking portion 23 so that the lead wire 9*b* is pulled out to the outside, but as illustrated in FIG. 11, it may be formed that the inner circumferential surface on the rear end side of the temperature detection portion 9*a* of the recess portion 40 is made to be the locking portion 23, and a groove 25 in which the lead wire 9*b* is fitted may be provided in the upper surface of the connection portion 22*c* continuously to the inner circumferential surface so that the lead wire 9*b* is pulled out to the outside.

(7) In the first embodiment, the annular core 10 is formed of the U-shaped cores 11 and 12 and the I-shaped core 13 as the core members, but the shapes of the core members are not limited to them. An E-shaped core, a T-shaped core, a J-shaped core, a columnar core and the like may be used as long as the annular shape can be formed.

(8) In the first embodiment, the annular core 10 having one ring is used, but the annular core 10 with two rings, having a θ-shape, formed by using a core comprising three or more leg portions like the E-shaped core may be used.

(9) In the first embodiment, the temperature sensor 9 is sandwiched in the gap between the resin member 20 and the coil 5 in close contact, but from a viewpoint of fixation of a sensor position, a target to be sandwiched in the gap may be a sensor having a columnar detection portion such as a magnetic sensor, a current sensor, a temperature fuse and the like instead of the temperature sensor 9.

(10) In the first embodiment, the locking portion 23 is provided, but position of the temperature sensor 9 in the x-axis direction can be also regulated by the inner circumferential surface of the recess portion 40 opposed to the temperature detection portion 9*a*. That is, in the first embodiment, the locking portion 23 is made as the protruding portion, but the inner circumferential surface of the recess portion 40 opposed to the temperature detection portion 9*a* may be made as the protruding portion. Specifically, since the inner circumferential surface of the recess portion 40 corresponding to the lower side of the trapezoid protrudes higher than the bottom surface of the recess portion 40, when the lead wire 9*b* rides over and contacts the upper edge of the inner circumferential surface of the recess portion 40, the position in the x-axis direction of the temperature detection portion 9*a* can be regulated. In other words, it is only essential that there is a step from the bottom surface of the recess portion 40.

(11) In the first embodiment, the locking portion 23 is provided coaxially with the temperature detection portion 9*a* and adjacent to the recess portion 40 on the rear end side of the temperature detection portion 9*a*, but it may be arranged away from the recess portion 40. In this case, like the first embodiment, the insertion port 41 is provided on the outward of the axis of the temperature detection portion 9*a*. Moreover, the locking portion 23 has the notch 23*a* provided on the side opposite to the insertion port 41 and which the lead wire 9*b* is passed through, and the inner circumferential surface of the recess portion 40 is provided with the side-part position regulating portion 44 opposed to the insertion guide 42 and having the shape following the side part of the temperature detection portion 9*a*. In this way, too, the temperature sensor 9 can be prevented from falling off. Since the temperature sensor 9 has its position regulated in the direction (x-axis direction) orthogonal to the extending direction of the temperature detection portion 9*a* by the side-part position regulating portion 44 and the locking portion 23, falling off of the temperature sensor 9 from the gap between the resin member 20 and the coil 5 through the insertion port 41 can be prevented. In this aspect, the insertion port 41 may be one side of the trapezoidal recess portion 40.

Figure 12:
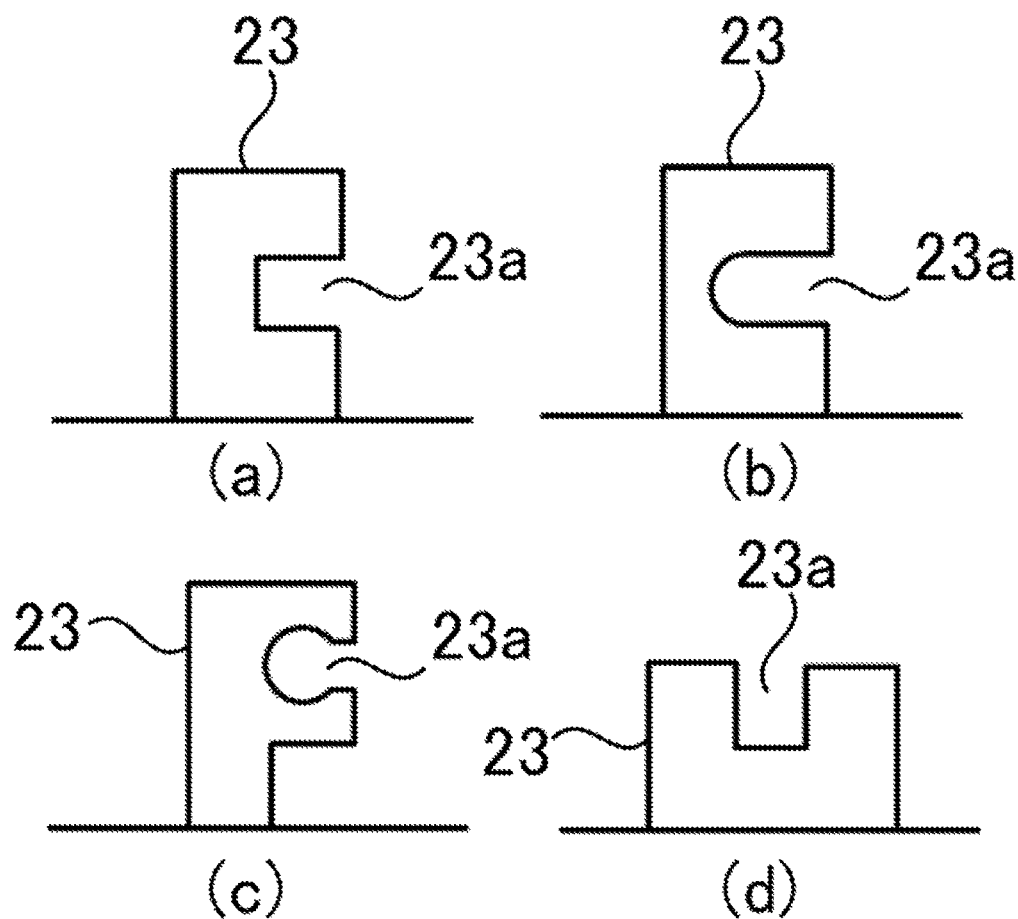
FIG. 12 are views for explaining a variation of the locking portion.

(12) FIGS. 12(a) to 12(d) are the locking portion 23 when viewed from the x-direction. In the first embodiment, as illustrated in FIG. 12(a), the notch 23a of the locking portion 23 has a rectangular shape, but as illustrated in FIG. 12(b), it may be a semi-oval shape. Moreover, as illustrated in FIG. 12(c), the notch 23a may have a shape hollowed to the side surface of the locking portion 23 so that the lead wire 9b passed through the notch 23a is not fallen off easily. Furthermore, as illustrated in FIG. 12(d), the notch 23a may be provided to be directed upward. In other words, a groove through which the lead wire 9b is passed may be provided in the upper part of the locking portion 23. This groove may have a shape hollowed toward the upper surface of the locking portion 23 so that the lead wire 9b passed through the groove is not fallen off easily.

(13) The shape of the recess portion 40 and arrangement of the locking portion 23 may be reversed right and left with respect to the winding axis of the coil 5. That is, the insertion guide 42 is located on the linear portion 22a side. In this case, the notch 23a is positioned to be directed to a negative side in the y-axis direction.

REFERENCE NUMERALS 10 annular core
11, 12 block-shaped core
13 I-shaped core
14 spacer
20 resin member
21 resin body
21a, 21b linear portion
21c connection portion
21d, 21e wall portion
21f rib
21g notch
22 resin member
22a, 22b linear portion
22c connection portion
23 locking portion
23a notch
24 spacer
25 groove
31 fixing portion
32 collar
33 supporting arm
40 recess portion
41 insertion port
42 insertion guide
43 tip position regulating portion
44 side-part position regulating portion
5 coil
51a, 51b coil
51c connecting line
52a, 52b end portion
9 temperature sensor
9a temperature detection portion
9b lead wire

What is claimed is:

1. A reactor, comprising:
a core;
a resin member covering a periphery of the core;
a coil attached to an outer circumference of the resin member; and
a temperature sensor inserted into a gap between the resin member and the coil,
wherein:
the temperature sensor has a columnar temperature detection portion,
at least a part of the temperature detection portion is sandwiched by the resin member and the coil in close contact,
the resin member is provided with a recess portion in which the temperature detection portion is arranged,
the recess portion has an insertion port through which the temperature sensor is to be inserted; and
an inner circumferential surface of the recess portion is provided with an insertion guide for the temperature sensor continuously from the insertion port guiding a tip of the temperature detection portion to a position the tip of the temperature detection portion is to be arranged to.

2. The reactor according to claim 1, wherein
the recess portion has a shape wider on a side where the temperature detection portion is to be inserted, and dented on a depth side.

3. The reactor according to claim 1, wherein
the inner circumferential surface of the recess portion is provided with a tip position regulating portion having a shape following the tip of the temperature detection portion.

4. The reactor according to claim 3, wherein
the insertion guide extends from the insertion port to the tip position regulating portion.

5. The reactor according to claim 1, wherein
the insertion port and a part of the insertion guide are exposed to an outside of the coil attached to the outer circumference of the resin member.

6. The reactor according to claim 3, wherein
a bottom surface of the recess portion is provided with inclination which gradually reduces the gap from the insertion port side toward the tip position regulating portion side.

7. The reactor according to claim 1, wherein:
the temperature sensor has a lead wire connected to a rear end of the temperature detection portion;
the resin member is provided with a protruding portion opposing to the rear end of the temperature detection portion and protruding higher than a bottom surface of the recess portion; and
the lead wire abuts on the protruding portion.

8. The reactor according to claim 7, wherein:
on a surface of the resin member, a locking portion is arranged as the protruding portion coaxially with the temperature detection portion and on the rear end side of the temperature detection portion;
the locking portion is provided with a notch which the lead wire is passed through; and
the lead wire abuts on an inner circumferential surface of the locking portion forming the notch.

9. The reactor according to claim 7, wherein:
the protruding portion is the inner circumferential surface of the recess portion opposed to the rear end of the temperature detection portion; and
the lead wire abuts on the inner circumferential surface of the recess portion.

10. The reactor according to claim 8, wherein:
the insertion port is provided adjacent to the locking portion;

the notch is provided on a side opposite to the insertion port;

the lead wire passes through the notch; and the inner circumferential surface of the recess portion is provided with a side-part position regulating portion, opposing to the insertion guide and having a shape following a side of the temperature detection portion.

11. The reactor according to claim 9, wherein:

on a surface of the resin member, a locking portion is arranged coaxially with the temperature detection portion and on the rear end side of the temperature detection portion, the locking portion being provided distant from the recess portion;

the insertion port is provided on an outward of the axis of the temperature detection portion;

the locking portion has a notch provided on a side opposite to the insertion port and which the lead wire is passed through; and the inner circumferential surface of the recess portion is provided with a side-part position regulating portion, opposing to the insertion guide and having a shape following a side of the temperature detection portion.

12. The reactor according to claim 1 wherein:

the resin member is provided with, on a surface where the coil is attached, a spacer on which an inner circumferential surface of the coil abuts so as to keep a distance with respect to the inner circumferential surface of the coil; and the recess portion is provided on the spacer.

13. The reactor according to claim 1 wherein:

the coil has a wire rod and a self-fusion layer formed on a surface of the wire rod; and adjacent parts of the wire rod are bonded by the self-fusion layer.

14. The reactor according to claim 13, wherein the temperature detection portion is bonded to the self-fusion layer.

15. The reactor according to claim 1 wherein a tip portion of the temperature detection portion is arranged to be located at a center of the length in the winding axis direction of the coil.

16. The reactor according to claim 1 wherein:

the core has a plurality of core members and a gap spacer inserted between the core members; and a tip portion of the temperature detection portion is arranged above the gap spacer.

* * * * *